(12) United States Patent
Hunt et al.

(10) Patent No.: US 11,944,035 B2
(45) Date of Patent: Apr. 2, 2024

(54) SYSTEM AND METHOD FOR CONTROLLING HARVESTING IMPLEMENT HEIGHT OF AN AGRICULTURAL HARVESTER BASED ON ERROR SIGNAL FREQUENCY COMPONENTS

(71) Applicant: CNH Industrial America LLC, New Holland, PA (US)

(72) Inventors: Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 512 days.

(21) Appl. No.: 17/308,654

(22) Filed: May 5, 2021

(65) Prior Publication Data

US 2022/0354056 A1    Nov. 10, 2022

(51) Int. Cl.
*A01D 41/14*    (2006.01)
*A01D 41/127*    (2006.01)

(52) U.S. Cl.
CPC ....... *A01D 41/141* (2013.01); *A01D 41/1274* (2013.01); *A01D 41/145* (2013.01)

(58) Field of Classification Search
CPC .............. A01D 41/141; A01D 41/1274; A01D 41/145; G05D 2201/0201; A01B 79/005; A01B 63/008; G06T 2207/30188
See application file for complete search history.

(56) References Cited

U.S. PATENT DOCUMENTS

| | | | |
|---|---|---|---|
| 4,414,792 A | 11/1983 | Bettencourt et al. | |
| 4,944,141 A | 7/1990 | Orlando et al. | |
| 5,704,200 A | 1/1998 | Chmielewski et al. | |
| 10,281,905 B2 | 5/2019 | French, Jr. | |
| 10,455,765 B2 | 10/2019 | Seiders, Jr. | |
| 2011/0099962 A1* | 5/2011 | Coers | A01D 41/141 56/10.4 |
| 2015/0195991 A1* | 7/2015 | Ricketts | A01D 34/03 56/249 |
| 2018/0255706 A1 | 9/2018 | Smith et al. | |
| 2019/0230855 A1 | 8/2019 | Reed et al. | |
| 2020/0077584 A1* | 3/2020 | Miller | A01D 41/145 |

(Continued)

OTHER PUBLICATIONS

Extended European Search Report for EP Application No. 22171632.7 dated Oct. 10, 2022 (5 pages).

*Primary Examiner* — Kenneth J Malkowski
(74) *Attorney, Agent, or Firm* — Peter K. Zacharias (57) ABSTRACT

A system for controlling harvesting implement height of an agricultural harvester may include a computing system configured to monitor the height of a harvesting implement of the harvester relative to a field surface based on the received sensor data. Additionally, the computing system may be configured to determine an implement height error signal by comparing the monitored height of the harvesting implement to a predetermined target height. Moreover, the computing system is configured to divide the determined implement height error signal into a first and second frequency portions, with the second frequency portion having a greater frequency than the first frequency portion. Furthermore, the computing system is configured to control the operation of first and second actuators of the harvester based on the first and second frequency portions of the implement height error signal, respectively.

20 Claims, 5 Drawing Sheets

(56) References Cited

U.S. PATENT DOCUMENTS

| | | |
|---|---|---|
| 2020/0084968 A1* | 3/2020 | Weitenberg ........ A01D 34/8355 |
| 2021/0055158 A1 | 2/2021 | Hunt et al. |
| 2021/0120725 A1 | 4/2021 | Seiders, Jr. |

* cited by examiner

SYSTEM AND METHOD FOR CONTROLLING HARVESTING IMPLEMENT HEIGHT OF AN AGRICULTURAL HARVESTER BASED ON ERROR SIGNAL FREQUENCY COMPONENTS

FIELD OF THE INVENTION

The present disclosure generally relates to agricultural harvesters and, more particularly, to systems and methods for controlling harvesting implement height of an agricultural harvester based on error signal frequency components.

BACKFIELD OF THE INVENTION

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a portion of the field. In this respect, most harvesters are equipped with a detachable header or harvesting implement, which cuts and collects the crop from the field. The harvester also includes a crop processing system, which performs various processing operations (e.g., threshing, separating, etc.) on the harvested crop received from the header. Furthermore, the harvester includes a crop tank, which receives and stores the harvested crop after processing.

When performing a harvesting operation, the header is positioned at a predetermined height above the field surface. Such positioning, in turn, permits a cutter bar mounted on the header to sever the crops present within the field from the associated stubble at a desired cutting height. As the harvester travels across the field to perform the harvesting operation, the contour or topography of the field may vary. In this respect, many current combines use an automatic header height control system that attempts to maintain a generally constant cutting height above the field surface regardless of the field contour or field position relative to the base combine. While such systems work well, improvements are needed.

Accordingly, an improved system and method for controlling harvesting implement height of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling harvesting implement height of an agricultural harvester. The system includes first and second actuators configured to adjust first and second operating parameters associated with a height or an orientation of the harvesting implement relative to a field surface, respectively. Furthermore, the system includes a sensor configured to capture data indicative of the height of the harvesting implement relative to the field surface and a computing system communicatively coupled to the sensor. In this respect, the computing system is configured to monitor the height of the harvesting implement relative to the field surface based on the data captured by the sensor. Additionally, the computing system is configured to determine an implement height error signal by comparing the monitored height of the harvesting implement to a predetermined target height. Moreover, the computing system is configured to divide the determined implement height error signal into a first frequency portion and a second frequency portion, with the second frequency portion having a greater frequency than the first frequency portion. In addition, the computing system is configured to control an operation of the first actuator based on the first frequency portion of the implement height error signal. Furthermore, the computing system is configured to control an operation of the second actuator based on the second frequency portion of the implement height error signal.

In another aspect, the present subject matter is directed to a method for controlling harvesting implement height of an agricultural harvester. The agricultural harvester, in turn, includes first and second actuators configured to adjust first and second operating parameters associated with a height of the harvesting implement relative to a field surface, respectively. The method includes monitoring, with a computing system including one or more computing devices, the height of the harvesting implement relative to the field surface. Furthermore, the method includes determining, with the computing system, an implement height error signal by comparing the monitored height of the harvesting implement to a predetermined target height. Additionally, the method includes dividing, with the computing system, the implement height error signal into a first frequency portion and a second frequency portion, with the second frequency portion having a greater frequency than the first frequency portion. Moreover, the method includes controlling, with the computing system, an operation of the first actuator based on the first frequency portion of the implement height error signal. In addition, the method includes controlling, with the computing system, an operation of the second actuator based on the second frequency portion of the implement height error signal.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling harvesting implement height of an agricultural harvester. As will be described below, the agricultural harvester may include a chassis, a feeder housing pivotably coupled the chassis, and a feeder face plate pivotably coupled to the feeder housing. The feeder face plate may, in turn, be coupled to a harvesting implement (e.g., a header) of the harvester. Moreover, the harvesting implement may include a cutter bar configured to sever the crops present within the field from the associated stubble.

Furthermore, the agricultural harvester may include first and second actuators configured to adjust first and second operating parameters associated with a height of the harvesting implement relative to the field surface, respectively. For example, in some embodiments, the first actuator(s) may correspond to a lift actuator(s) configured to pivot the feeder housing relative to the chassis such that the harvesting implement is raised and lowered relative to the field surface. Additionally, in such embodiments, the second actuator(s) may correspond to a tilt actuator(s) configured to pivot the feeder face plate relative to the feeder housing. Such pivoting, in turn, adjusts the fore/aft tilt angle or orientation of the harvesting implement relative to the field surface, which raises or lowers the cutter bar relative to the field surface.

In several embodiments, a computing system may be configured to control the operation of the lift and tilt actuators to maintain the cutter bar of the header at a desired height above the field surface. More specifically, the computing system may monitor the height of the header relative to the field surface (e.g., based on received sensor data). Moreover, the computing system may determine an implement height error signal by comparing the monitored height of the harvesting implement to a predetermined target height. In addition, the computing system may divide the implement height error signal into a first or low frequency portion and a second or high frequency portion. For example, in one embodiment, the computing system may pass the implement height error signal through a high pass filter to determine the high frequency portion and a low pass filter to determine the low frequency portion. Thereafter, the computing system may control the operation of the lift and tilt actuators based on the low and high frequency portions of the implement height error signal, respectively.

Controlling the operation of the lift and tilt actuators based on the low and high frequency portions of the implement height error signal, respectively, improves the operation of the agricultural harvester. More specifically, the harvesting implement generally has a much greater translational moment of inertia than rotational moment of inertia. As such, more force is required to lift the harvesting implement with the lift actuator(s) than to tilt the harvesting implement with the tilt actuator(s). Thus, the harvesting implement can be tilted with the tilt actuator(s) much quicker than it can be lifted with the lift actuator(s). However, the tilt actuator(s) generally have a much smaller range of motion than the lift actuator(s). The low frequency portions of the implement height error signal are generally associated with larger, but slower changes in field topography. Conversely, the high frequency portions of the implement height error signal are generally associated with small, but quicker changes in field topography. In this respect, using the low frequency portions to control the operation of the lift actuator(s) allows the system to make large adjustments to the cutter bar height that could not be made with the tilt actuator(s) (e.g., due to its/their smaller range of motion). Moreover, using the high frequency portions to control the operation of the tilt actuator(s) allows the system to make small and frequent to the cutter bar height that could not be made with the lift actuator(s) (e.g., due its/their slower response time(s)). Thus, controlling the operation of the lift and tilt actuators based on the low and high frequency portions allows a generally constant cutting height to be maintained regardless of the magnitude or frequency at which the field topography changes.

Figure 1:
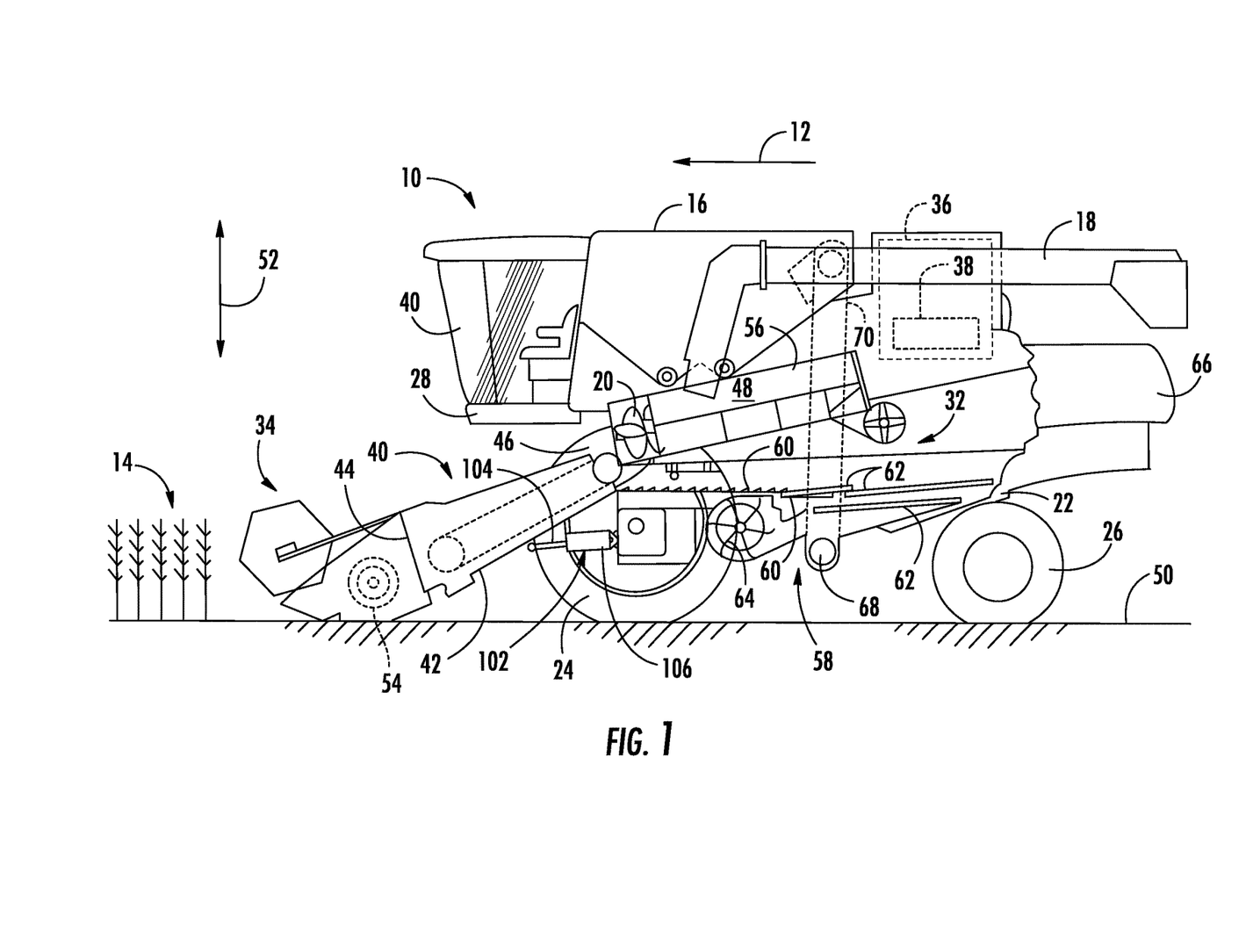
FIG. 1 illustrates a partial sectional side view of one embodiment of an agricultural harvester in accordance with aspects of the present subject matter.

Referring now to the drawings, FIG. 1 illustrates a partial sectional side view of the agricultural harvester 10. In general, the harvester 10 may be configured to travel across a field in a forward direction of travel (indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10. Moreover, in the illustrated embodiment, the harvester 10 is configured as an axial-flow type combine in which the harvested crop is threshed and separated while being advanced by and along a longitudinally arranged rotor 20. However, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the chassis 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 supported by the chassis 22. As will be described below, the crop processing system 32 may be configured to perform various processing operations on the harvested crop as the crop processing system 32 transfers the harvested crop between a harvesting implement 34 (e.g., a header) of the harvester 10 and the crop tank 16. Furthermore, the harvester 10 may include an engine 36 and a transmission 38 mounted on the chassis 22. The transmission 38 may be operably coupled to the engine 36 and may provide variably adjusted gear ratios for transferring engine power to the wheels 24 via a drive axle assembly (or via axles if multiple drive axles are employed).

Furthermore, as shown in FIG. 1, the harvester 10 includes a feeder 40 that couples to and supports the harvesting implement 34. More specifically, the feeder 40 may include a feeder housing 42 extending from the forward end 44 to an aft end 46. As will be described below, the forward end 44 of the feeder housing 42 may, in turn, be coupled to harvesting implement 34. Moreover, the aft end 46 of the feeder housing 42 may be pivotably coupled to the chassis 22 adjacent to a threshing and separating assembly 48 of the crop processing system 32. Such a pivotable coupling may permit movement of the harvesting implement 34 relative to a field surface 50 in a vertical direction (indicated by arrow 52).

Additionally, the agricultural harvester 10 may include one or more lift actuators 102 coupled between the chassis 22 and the feeder housing 42. In several embodiments, the lift actuator(s) 102 may correspond to a fluid-driven actuator(s), such as a hydraulic or pneumatic cylinder(s). In such embodiments, a rod(s) 104 of the lift actuator(s) 102 may be extended relative to an associated cylinder(s) 106 of the lift actuator(s) 102 to pivot the forward end 44 of the feeder housing 42 upward in the vertical direction 52, thereby raising the harvesting implement 34 relative to the field surface 50. Similarly, the rod(s) 104 of the lift actuator(s) 102 may be retracted relative to the associated cylinder(s) 106 of the lift actuator(s) 102 to pivot the forward end 44 of the feeder housing 42 downward in the vertical direction 52, thereby lowering the harvesting implement 34 relative to the field surface 50. In this respect, the operation of the lift actuator(s) 102 may be controlled to move the harvesting implement 34 upward and downward in the vertical direction 52 relative to a field surface 50 to adjust the cutting height or distance (e.g., as indicated by arrow 55 in FIG. 2) between a cutter bar 57 (FIG. 2) of the harvesting implement 34 and the field surface 50 as the topography of the field varies. However, in alternative embodiments, the lift actuator(s) 102 may correspond to any other suitable type of actuator(s), such as an electric linear actuator(s).

As the harvester 10 is propelled in the forward direction of travel 12 over the field with the crop 14, the crop material is severed from the stubble by one or more knives (not shown) positioned on the cutter bar 57 at the front of the harvesting implement 34. The crop material is delivered by a header auger 54 to the forward end 44 of the feeder housing 42, which supplies the harvested crop to the threshing and separating assembly 48. In general, the threshing and separating assembly 48 may include a cylindrical chamber 56 in which the rotor 20 is rotated to thresh and separate the harvested crop received therein. That is, the harvested crop is rubbed and beaten between the rotor 20 and the inner surfaces of the chamber 56 to loosen and separate the grain, seed, or the like from the straw.

The harvested crop separated by the threshing and separating assembly 48 may fall onto a crop cleaning assembly 58 of the crop processing system 32. In general, the crop cleaning assembly 58 may include a series of pans 60 and associated sieves 62. In general, the separated harvested crop may be spread out via the oscillation of pans 60 and/or sieves 62 and may eventually fall through apertures defined by the sieves 62. Additionally, a cleaning fan 64 may be positioned adjacent to one or more of the sieves 62 to provide an air flow through the sieves 62 that removes chaff and other impurities from the harvested crop. For instance, the fan 64 may blow the impurities off the harvested crop for discharge from the harvester 10 through the outlet of a straw hood 66 positioned at the back end of the harvester 10. The cleaned harvested crop passing through the sieves 62 may then fall into a trough of an auger 68, which may be configured to transfer the harvested crop to an elevator 70 for delivery to the crop tank 16.

Figure 2:
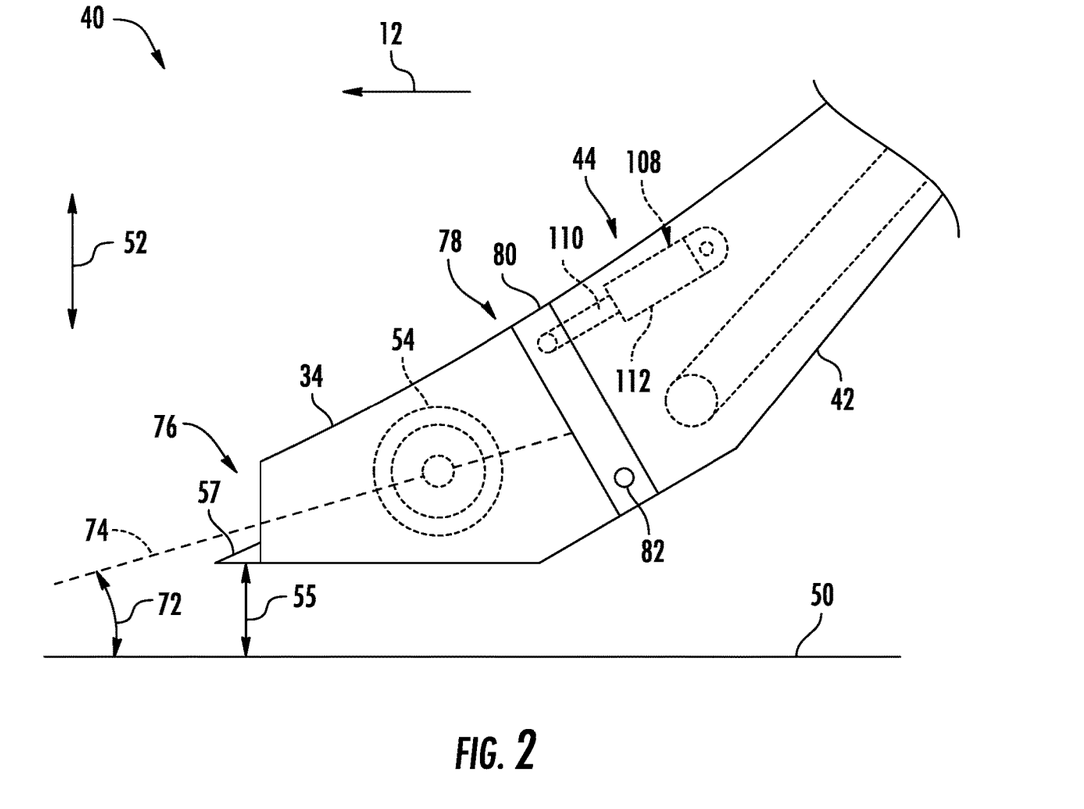
FIG. 2 illustrates a side view of one embodiment of a feeder of an agricultural harvester in accordance with aspects of the present subject matter.

Referring now to FIG. 2, a side view of one embodiment of a feeder 40 of the agricultural harvester 10 is illustrated. As mentioned above, the feeder 40 may include a feeder housing 42 having its forward end 44 coupled to the harvesting implement 34. In several embodiments, the harvesting implement 34 may be coupled to the feeder 40 to permit a fore/aft tilt angle (indicated by arrow 72) of the harvesting implement 34 to be adjusted. The "fore/aft tilt angle" of the harvesting implement 34, in turn, is the angle defined between a longitudinal axis 74 of the harvesting implement 34 and the field surface 50, with the longitudinal axis 74 extending between a forward end 76 of the harvesting implement 34 and an aft end 78 of the harvesting implement 34. Specifically, in one embodiment, the feeder 40 may include a feeder face plate 80 pivotably coupled to the forward end 44 of the feeder housing 42 via a pivot joint 82. Moreover, the feeder face plate 80 may be coupled (e.g., bolted) to the harvesting implement 34. However, in alternative embodiments, the harvesting implement 34 may be pivotably coupled to the feeder 40 in any other suitable manner.

Additionally, the agricultural harvester 10 may include one or more tilt actuators 108 configured to adjust the fore/aft tilt angle 72 of the harvesting implement 34. For example, the tilt actuator(s) 108 may be coupled between the feeder face plate 80 and the forward end 44 of the feeder housing 42. In several embodiments, the tilt actuator(s) 108 may correspond to a fluid-driven actuator(s), such as a hydraulic or pneumatic cylinder(s). In such embodiments, a rod(s) 110 of the tilt actuator(s) 108 may be extended relative to an associated cylinder(s) 112 of the tilt actuator(s) 108 to pivot the feeder face plate 80 relative to the forward end 44 of the feeder housing 42. Such extension may, in turn, pivot the harvesting implement 34 in a manner that lowers the forward end 76 of the harvesting implement 34 relative to the field surface 50, thereby increasing the fore/aft tilt angle 72 and decreasing the cutting height 55. Similarly, the rod(s) 110 of the tilt actuator(s) 108 may be retracted relative to the associated cylinder(s) 112 of the tilt actuator(s) 108 to pivot the feeder face plate 80 relative to the forward end 44 of the feeder housing 42. Such retraction may, in turn, pivot the harvesting implement 34 in a manner that raises the forward end 76 of the harvesting implement 34 relative to the field surface 50, thereby decreasing or flattening the fore/aft tilt angle 72 and increasing the cutting height 55. In this respect, the operation of the tilt actuator(s) 108 may be controlled to move the cutter bar 57 upward and downward in the vertical direction 52 relative to a field surface 50 to adjust the cutting height 55. As will be described below, the operation of the tilt actuator(s) 108 may be controlled in addition to the lift actuator(s) 102 to maintain a generally constant cutting height 55 above the field surface 50 as field topography changes. However, in alternative embodiments, the tilt actuator(s) 108 may correspond to any other suitable type of actuator(s), such as an electric linear actuator(s).

It should be further appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
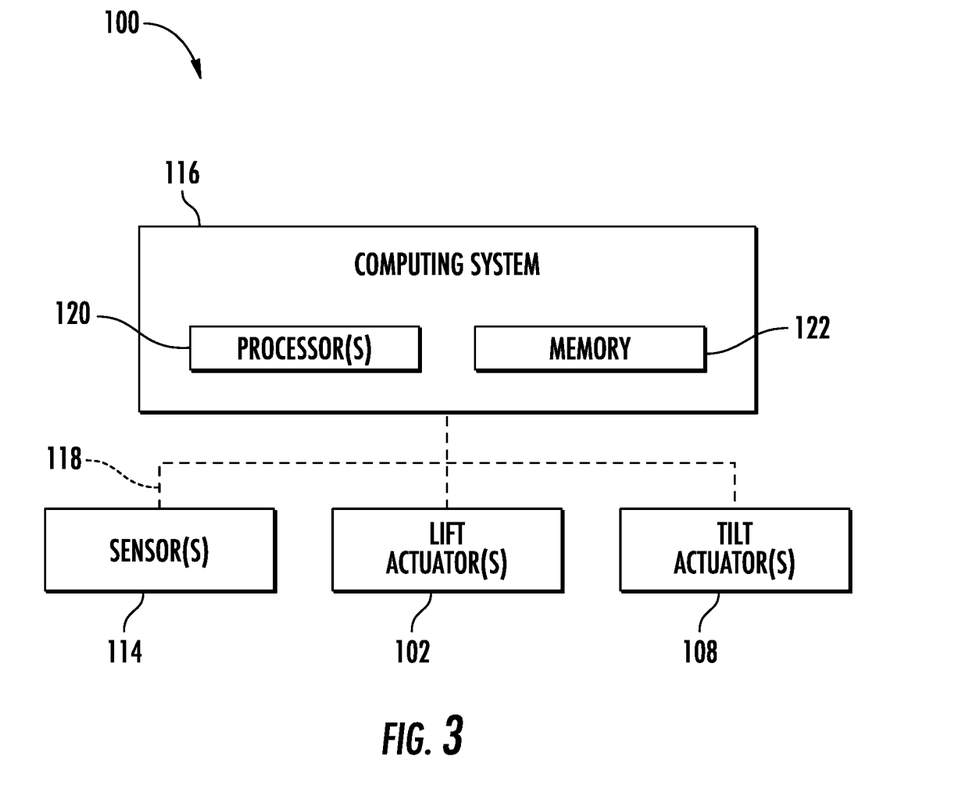
FIG. 3 illustrates a schematic view of one embodiment of a system for controlling harvesting implement height of an agricultural harvester in accordance with aspects of the present subject matter.

Referring now to FIG. 3, a schematic view of one embodiment of a system 100 for controlling harvesting implement height of an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvesters having any other suitable harvester configuration.

As shown in FIG. 3, the system 100 may include one or more sensors 114 of the agricultural harvester 10. In general, the sensor(s) 114 may be configured to capture data indicative of the distance between the harvesting implement 34 and the field surface 50. In several embodiments, the sensor(s) 114 may be configured to capture data indicative of the cutting height or the distance between the cutter bar 57 and the field surface 50 (e.g., the distance 55 in FIG. 2). As will be described below, the data captured by the sensor(s) 114 may be used to control the operation of the lift and tilt actuators 102, 108 to maintain a generally constant cutting height at the topography or surface profile of the field varies.

The sensor(s) 114 may be configured in any suitable manner that allows the sensor(s) 114 to capture data indicative of the distance between the harvesting implement 34 and the field surface 50. In several embodiments, the sensor(s) 114 may be non-contact-based sensor(s). For example, in one embodiment, the sensor(s) 114 may be ultrasonic sensor(s) positioned within the harvesting implement 34 that detect the distance between the sensor(s) 114 and the field surface 50 using emitted sounds waves. Alternatively, the sensor(s) 114 may be contact-based sensor(s). For example, in one embodiment, the sensor(s) 114 may include a biased or spring-loaded sensor arm(s) (not shown) that contacts the ground as the harvester 10 travels across the field.

In several embodiments, the system 100 may include a computing system 116 communicatively coupled to one or more components of the agricultural harvester 10 to allow the operation of such components to be electronically or automatically controlled by the computing system 116. For instance, the computing system 116 may be communicatively coupled to the sensor(s) 114 via a communicative link 118. As such, the computing system 116 may be configured to receive data from the sensor(s) 114 indicative of the distance between the harvesting implement 34 and the field surface 50 (e.g., the cutting height or the distance between the cutter bar 57 and the field surface 50). Moreover, the computing system 116 may be communicatively coupled to the lift actuator(s) 102 of the harvester 10 via the communicative link 118. In this respect, the computing system 116 may be configured to control the operation of the lift actuator(s) 102 such that the actuator(s) 102 raises and lowers the harvesting implement 34 relative to the field surface. Furthermore, the computing system 116 may be communicatively coupled to the tilt actuator(s) 108 of the harvester 10 via the communicative link 118. In this respect, the computing system 116 may be configured to control the operation of the tilt actuator(s) 108 such that the actuator(s) 108 adjusts the fore/aft tilt angle of the harvesting implement 34 relative to the field surface. Additionally, the computing system 116 may be communicatively coupled to any other suitable components of the agricultural harvester 10 via the communicative link 118, such as the engine 36, the transmission 38, and/or the like.

In general, the computing system 116 may comprise one or more processor-based devices, such as a given controller or computing device or any suitable combination of controllers or computing devices. Thus, in several embodiments, the computing system 116 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 122 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 122 may generally be configured to store suitable computer-readable instructions that, when implemented by the processor(s) 120, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a harvesting implement controller (e.g., a header height controller and/or header tilt angle controller), a navigation controller, an engine controller, and/or the like.

Figure 4:
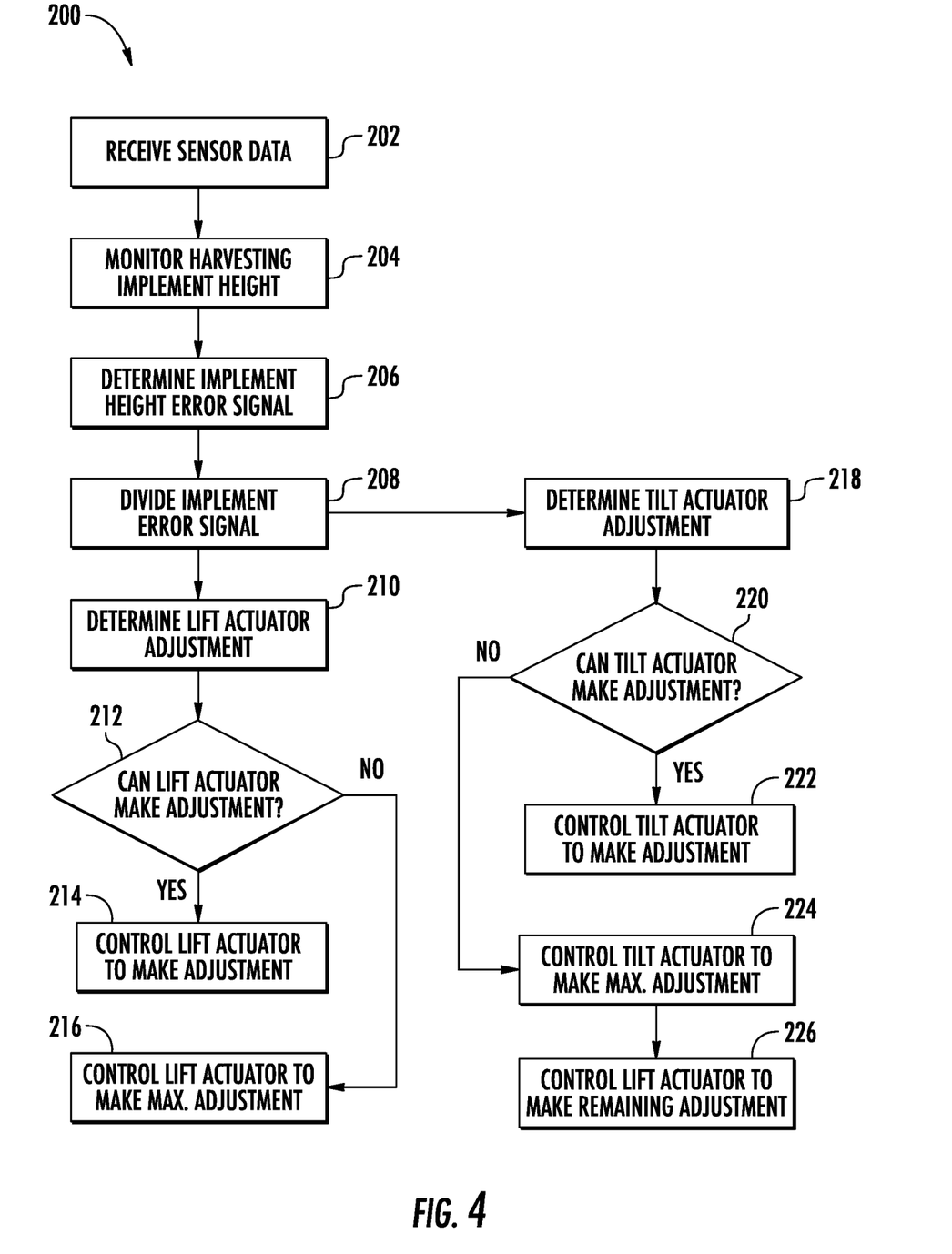
FIG. 4 illustrates a flow diagram providing one embodiment of example control logic for controlling harvesting implement height of an agricultural harvester in accordance with aspects of the present subject matter.

Referring now to FIG. 4, a flow diagram of one embodiment of example control logic 200 that may be executed by the computing system 116 (or any other suitable computing system) for controlling harvesting implement height of an agricultural harvester is illustrated in accordance with aspects of the present subject matter. Specifically, the control logic 200 shown in FIG. 4 is representative of steps of one embodiment of an algorithm that can be executed to control the harvesting implement height of an agricultural harvester in a manner that simultaneously controls the operation of the lift and tilt actuators of the harvester to maintain a generally constant cutting height as field topography changes. Thus, in several embodiments, the control logic 200 may be advantageously utilized in association with a system installed on or forming part of an agricultural harvester to allow for real-time control of harvesting implement height without requiring substantial computing resources and/or processing time. However, in other embodiments, the control logic 200 may be used in association with any other suitable system, application, and/or the like for controlling harvesting implement height of an agricultural harvester.

As shown in FIG. 4, at (202), the control logic 200 includes receiving sensor data indicative of the height of a harvesting implement of an agricultural harvester relative to the field surface. In several embodiments, as mentioned above, the computing system 116 may be communicatively coupled to the sensor(s) 114 via the communicative link 118.

In this respect, during operation of the harvester 10, the computing system 116 may receive data from the sensor(s) 114 that is indicative of the height of the harvesting implement 34 relative to the field surface 50. For example, in one embodiment, the computing system 116 may receive data from the sensor(s) 114 that is indicative of the cutting height or the height of the cutter bar 57 relative to the field surface 50 (e.g., the distance 55 in FIG. 2).

Furthermore, at (204), the control logic 200 includes monitoring the height of the harvesting implement relative to the field surface based on the received sensor data. For example, the computing system 116 may include a look-up table(s), suitable mathematical formula, and/or algorithms stored within its memory device(s) 122 that correlate the received sensor data to the height of the harvesting implement 34 (or, more specifically, the cutter bar 57) relative to the field surface 50.

Additionally, at (206), the control logic 200 includes determining an implement height error signal by comparing the monitored height of the harvesting implement to a predetermined target height. For example, the computing system 116 may compare the monitored height of the harvesting implement 34 (e.g., the height determined at (204)) to a predetermined target height. The predetermined target height may, in turn, be the desired cutting height or distance between the cutter bar 57 of the harvesting implement 34 and the field surface 50. Thereafter, the computing system 116 may determine or generate an implement height error signal based on the difference between the monitored height of the harvesting implement 34 (or, more specifically, the cutter bar 57) and the predetermined target height.

Moreover, at (208), the control logic 200 includes dividing the determined implement height error signal into a first frequency portion and a second frequency portion. Specifically, in several embodiments, the computing system 116 may be configured to divide the determined implement height error signal (e.g., the implement error signal determined at (206)) into a first or low frequency portion and a second or high frequency portion. The high frequency portion, in turn, has a greater frequency than the low frequency portion. In general, the low frequency portion of the implement error signal is indicative of larger and more gradual changes to the topography or profile of the field (e.g., hills, slopes, etc.). Conversely, the high frequency portion of the implement error signal is indicative of smaller and more frequent changes to the topography or profile of the field (e.g., small surface undulations, divots, etc.). In this respect, and as will be described below, the low frequency portion may be used to control the operation of the lift actuator(s) 102, while the high frequency portion may be used to control the operation of the tilt actuator(s) 108.

In some embodiments, at (208), the computing system 116 may use high and low pass filters to determine the high and low frequency portions of the implement height error signal. More specifically, in such embodiments, the computing system 116 may pass the implement height error signal through a low pass filter to determine the low frequency portion of the signal. Furthermore, in such embodiments, the computing system 116 may also pass the implement height error signal through a high pass filter to determine the determine frequency portion of the signal.

In other embodiments, at (208), the computing system 116 may use a single filter to determine the high and low frequency portions of the implement height error signal. More specifically, in such embodiments, the computing system 116 may pass the determined implement height error signal through a filter to determine one of the high or low frequency portions of the signal. Thereafter, the computing system 116 may determine of the other of the high or low frequency portions of the implement height error signal based on the determined high or low frequency portion and the original implement height error signal. For example, in one embodiment, the computing system 116 may pass the determined implement height error signal through a high pass filter to determine the high frequency portion of the signal. Thereafter, the computing system 116 may determine of the low frequency portion of the implement height error signal based on the determined high frequency portion and the original implement height error signal. However, in other embodiments, the computing system 116 may pass the determined implement height error signal through a low pass filter to determine the low frequency portion of the signal. Thereafter, the computing system 116 may determine of the high frequency portion of the implement height error signal based on the determined low frequency portion and the original implement height error signal.

However, in alternative embodiments, at (208), the computing system 116 may divide the determined implement height error signal into high and low frequency portions in any other suitable manner. For example, in some embodiments, the computing system 116 may use one or more band pass filters to divide the implement height error signal.

As shown in FIG. 4, at (210), the control logic 200 includes determining an adjustment to be made by the lift actuator(s) of the agricultural harvester based on the determined low frequency component. More specifically, as mentioned above, the low frequency component of the implement height error signal is indicative of larger and more gradual changes to the topography or profile of the field. Such changes in field topography may generally be too large for the limited range of motion of the tilt actuator(s) 108. However, in most instances, these changes in field topography are gradual enough that the lift actuator(s) 102 can adjust to height of the harvesting implement 34 relative to the field surface 50 quickly enough to maintain a generally constant cutting height. In this respect, the computing system 116 may analyze the low frequency portion of the implement height error signal to determine any adjustments to be made by the lift actuator(s) 102. Such adjustments, in turn, move the harvesting implement 34 in the vertical direction 52 relative to the chassis 22 of the harvester 10, thereby adjusting the cutting height of the cutter bar 57.

In addition, at (212), the control logic 200 includes determining when the lift actuator(s) is able to make the determined adjustments. In certain instances, the low frequency portion of the implement height error signal may dictate adjustments that the lift actuator(s) 102 is unable to make. For example, in such instances, the lift actuator(s) 102 may be unable to move the harvesting implement 34 to the desired position quickly enough to maintain a generally uniform cutting height. As such, the computing system 116 may compare the duration across which the lift actuator(s) 102 is to make the adjustments as determined at (210) to the minimum time necessary for the lift actuator(s) 102 to make such adjustments. When the lift actuator(s) 102 is able to make the adjustments as determined at (210) quickly enough, the computing system 116 may, at (214), control the operation of the lift actuator(s) 102 to make such adjustments at the speed determined at (210). Conversely, when the lift actuator(s) 102 cannot make the adjustments as determined at (210) quickly enough, the computing system 116 may, at (216), control the operation of the lift actuator(s) 102 to make the adjustments at the maximum speed that such adjustments can be made.

Furthermore, at (218), the control logic 200 includes determining an adjustment to be made by the tilt actuator(s) of the agricultural harvester based on the determined high frequency component. More specifically, as mentioned above, the high frequency component of the implement height error signal is indicative of smaller and more frequent changes to the topography or profile of the field. The lift actuator(s) 102 may generally be unable to respond to such changes in the field topography. However, in most instances, these changes in field topography are small enough that the tilt actuator(s) 108 is able to adjust to height of the harvesting implement 34 relative to the field surface 50 to maintain a generally constant cutting height. In this respect, the computing system 116 may analyze the high frequency portion of the implement height error signal to determine any adjustments to be made by the tilt actuator(s) 108. Such adjustments, in turn, adjust the fore/aft tilt angle 72 of the harvesting implement 34, thereby adjusting the cutting height of the cutter bar 57.

Additionally, at (220), the control logic 200 includes determining when the tilt actuator(s) can make the determined adjustments. In certain instances, the high frequency portion of the implement height error signal may dictate adjustments that the tilt actuator(s) 108 is unable to make. For example, in such instances, the range of motion of the tilt actuator(s) 108 may be too small to move the cutter bar 57 of the harvesting implement 34 to the desired height. As such, the computing system 116 may compare the magnitude of the adjustments as determined at (218) to the maximum adjustment that the tilt actuator(s) 108 can make. When the tilt actuator(s) 108 is able to make the adjustments as determined at (218), the computing system 116 may, at (222), control the operation of the tilt actuator(s) 108 to make the determined adjustments. Conversely, when the tilt actuator(s) 108 is not able to make the adjustments determined at (218), the computing system 116 may, at (224), control the operation of the tilt actuator(s) 108 to make the maximum adjustments to the fore/aft tilt angle that can be made. Thereafter, the computing system 116 may, at (226), control the operation of the lift actuator(s) 102 to make the remaining adjustments.

Figure 5:
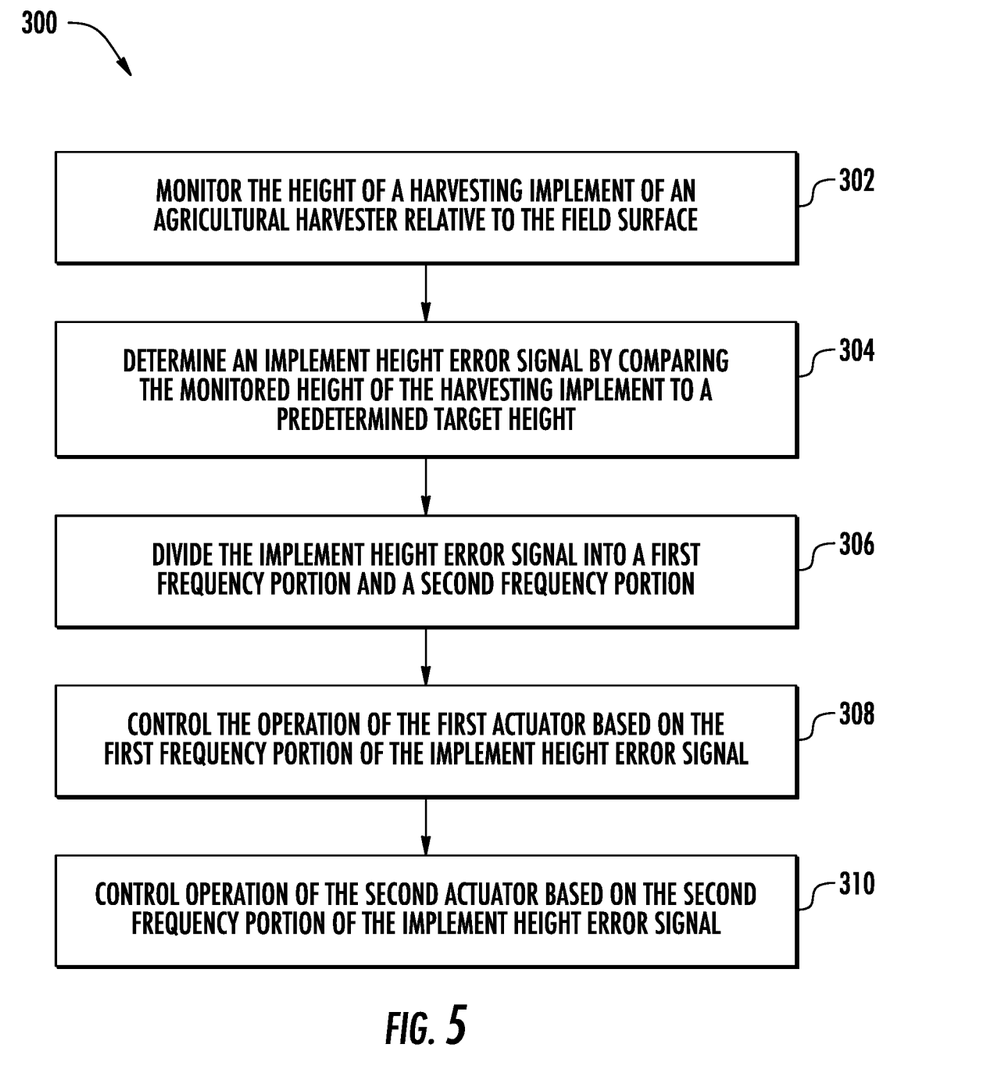
FIG. 5 illustrates a flow diagram of one embodiment of a method for controlling harvesting implement height of an agricultural harvester in accordance with aspects of the present subject matter.

Referring now to FIG. 5, a flow diagram of one embodiment of a method 300 for controlling harvesting implement height of an agricultural harvester is illustrated in accordance with aspects of the present subject matter. In general, the method 300 will be described herein with reference to the agricultural harvester 10 and the system 100 described above with reference to FIGS. 1-4. However, it should be appreciated by those of ordinary skill in the art that the disclosed method 300 may generally be implemented with any agricultural harvester having any suitable harvester configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include monitoring, with a computing system, the height of a harvesting implement of an agricultural harvester relative to a field surface. For example, as described above, the computing system 116 may monitor the height of the harvesting implement 34 of the agricultural harvester 10 relative to the field surface 50.

Furthermore, at (304), the method 300 may include determining, with the computing system, an implement height error signal by comparing the monitored height of the harvesting implement to a predetermined target height. For example, as described above, the computing system 116 may determine an implement height error signal by comparing the monitored height of the harvesting implement 34 to a predetermined target height.

Additionally, as shown in FIG. 5, at (306), the method 300 may include dividing, with the computing system, the implement height error signal into a first frequency portion and a second frequency portion. For example, as described above, the computing system 116 may divide the implement height error signal into a first or low frequency portion and a second or high frequency portion.

Moreover, at (308), the method 300 may include controlling, with the computing system, an operation of the first actuator based on the first frequency portion of the implement height error signal. For example, as described above, the computing system 116 may control the operation of the lift actuator(s) 102 based on the first or low frequency portion of the implement height error signal.

In addition, as shown in FIG. 5, at (310), the method 300 may include controlling, with the computing system, an operation of the second actuator based on the second frequency portion of the implement height error signal. For example, as described above, the computing system 116 may control the operation of the tilt actuator(s) 108 based on the second or high frequency portion of the implement height error signal.

It is to be understood that the steps of the control logic 200 and the method 300 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the control logic 200 and the method 300, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling harvesting implement height of an agricultural harvester, the system comprising:
   first and second actuators configured to adjust first and second operating parameters associated with a height or an orientation of the harvesting implement relative to a field surface, respectively;
   a sensor configured to capture data indicative of the height of the harvesting implement relative to the field surface; and
   a computing system communicatively coupled to the sensor, the computing system configured to:
      monitor the height of the harvesting implement relative to the field surface based on the data captured by the sensor;
      determine an implement height error signal by comparing the monitored height of the harvesting implement to a predetermined target height;
      divide the determined implement height error signal into a first frequency portion and a second frequency portion, the second frequency portion having a greater frequency than the first frequency portion;
      control an operation of the first actuator based on the first frequency portion of the implement height error signal; and
      control an operation of the second actuator based on the second frequency portion of the implement height error signal.

2. The system of claim 1, wherein, when dividing the implement height error signal, the computing system is further configured to pass the implement height error signal through a low pass filter to determine the first frequency portion.

3. The system of claim 2, wherein, when dividing the implement height error signal, the computing system is further configured to pass the implement height error signal through a high pass filter to determine the second frequency portion.

4. The system of claim 1, wherein, when dividing the implement height error signal, the computing system is further configured to pass the implement height error signal through a filter to determine one of the first frequency portion or the second frequency portion.

5. The system of claim 4, wherein, when dividing the implement height error, the computing system is further configured to determine the other of the first frequency portion or the second frequency portion based on the determined one of the first frequency portion or the second frequency portion and the implement height error.

6. The system of claim 1, wherein the first actuator comprises a lift actuator configured to adjust the height of the harvesting implement relative to the field surface.

7. The system of claim 6, further comprising:
   a chassis; and
   a feeder house pivotably coupled to the chassis, the feeder house configured to be coupled to the harvesting implement, wherein the lift actuator is coupled between the chassis and the feeder such that the lift actuator moves the harvesting implement relative to the chassis.

8. The system of claim 6, wherein the second actuator comprises a tilt actuator configured to adjust an orientation of the harvesting implement relative to the field surface.

9. The system of claim 8, further comprising:
   a feeder house pivotably coupled to the chassis, the feeder house configured to be coupled to the harvesting implement, wherein the tilt actuator is coupled between the feeder house and the harvesting implement such that the tilt actuator moves the harvesting implement relative to the feeder house.

10. The system of claim 1, wherein the first actuator and the second actuator comprise hydraulic cylinders.

11. A method for controlling harvesting implement height of an agricultural harvester, the agricultural harvester including first and second actuators configured to adjust first and second operating parameters associated with a height of the harvesting implement relative to a field surface, respectively, the method comprising:
   monitoring, with a computing system, the height of the harvesting implement relative to the field surface;
   determining, with the computing system, an implement height error signal by comparing the monitored height of the harvesting implement to a predetermined target height;
   dividing, with the computing system, the implement height error signal into a first frequency portion and a second frequency portion, the second frequency portion having a greater frequency than the first frequency portion;
   controlling, with the computing system, an operation of the first actuator based on the first frequency portion of the implement height error signal; and
   controlling, with the computing system, an operation of the second actuator based on the second frequency portion of the implement height error signal.

12. The method of claim 11, wherein dividing the implement height error signal comprises passing, with the computing system, the implement height error signal through a high pass filter to determine the first frequency portion.

13. The method of claim 12, wherein dividing the implement height error signal comprising passing, with the computing system, the implement height error signal through a low pass filter to determine the second frequency portion.

14. The method of claim 11, wherein dividing the implement height error signal comprising passing, with the computing system, the implement height error signal through a filter to determine one of the first frequency portion or the second frequency portion.

15. The method of claim 14, wherein dividing the implement height error signal comprising determining, with the computing system, the other of the first frequency portion or the second frequency portion based on the determined one of the first frequency portion or the second frequency portion and the implement height error signal.

16. The method of claim 11, wherein the first actuator comprises a lift actuator configured to adjust the height of the harvesting implement relative to the field surface.

17. The method of claim 16, wherein the agricultural harvester further includes a chassis and a feeder house pivotably coupled to the chassis, the feeder house configured to be coupled to the harvesting implement, the lift actuator coupled between the chassis and the feeder such that the lift actuator moves the harvesting implement relative to the chassis.

18. The method of claim 16, wherein the second actuator comprises a tilt actuator configured to adjust an orientation of the harvesting implement relative to the field surface.

19. The method of claim 18, agricultural harvester further includes a feeder house pivotably coupled to the chassis, the feeder house configured to be coupled to the harvesting implement, the tilt actuator coupled between the feeder house and the harvesting implement such that the tilt actuator moves the harvesting implement relative to the feeder house.

20. The method of claim 11, wherein the first actuator and the second actuator comprise hydraulic cylinders.

\* \* \* \* \*